Dec. 31, 1957 M. H. STEWARD 2,818,502

TRANSPONDER SYSTEM

Filed Oct. 23, 1946

INVENTOR.
MALCOLM H. STEWARD

BY M. C. Hayes

ATTORNEY

United States Patent Office 2,818,502

Patented Dec. 31, 1957

2,818,502

TRANSPONDER SYSTEM

Malcolm H. Steward, Los Angeles, Calif.

Application October 23, 1946, Serial No. 705,113

2 Claims. (Cl. 250—15)

(Granted under Title 35, U. S. Code (1952), sec. 266)

This invention relates to pulse signaling systems of the type actuated to produce electrical energy signals in response to the reception of electrical energy signals from a remote source. More particularly, the invention relates to signaling systems of the pulse type, producing high power electrical energy pulses of short duration in response to received pulses, in which the average responsive frequency is held within selected limits regardless of large variation in the average recurrence frequency of the received energy pulses, such systems normally comprise a receiver which, on receipt of a pulse signal, trips off a pulse transmitter.

In many circumstances, particularly in identification equipment, it is desirable to have a signaling system capable of responding with a signal of selected characteristics upon reception of a signal of similar or dissimilar selected characteristics. Pulse type operation of such a system is preferable in many cases because of reduction in power and space requirements resulting therefrom. Under numerous circumstances, the responding equipment may simultaneously receive signals from several sources including noise. Should normal response action be continued under such a condition damage to the eqnuipment will result if the average power dissipation is increased beyond a safe limit.

It is, therefore, an object of the present invention to provide a signaling system of the foregoing type in which the average operating frequency is held within safe limits.

Another object of the present invention is to provide a signaling system of the foregoing type in which the responding frequency is held within selected limits by controlling the amplification produced by the receiving unit thereof to vary the amplitude of received signals causing response.

Other and further objects and features of the present invention will become apparent upon a careful consideration of the accompanying drawings and description.

In accordance with the general concepts of the present invention, a pulse signaling system is provided for responding with the generation of electrical energy upon receipt of a keying signal. The keying signal as received may be of very small amplitude and intermingled with static or other types of noise. These signals are applied to an amplifier having adjustable gain and then through a biased keying device to a transmitter device for generating the return pulse energy. Receiver output signals and signals produced in coincidence with the production of energy by the transmitter are supplied into a transmitter control circuit wherein they are integrated to provide a gain control signal for the receiver. By means of this signal the receiver amplification is adjusted so that the recurrent frequency of the return pulse energy is prevented from exceeding a selected limit and the transmitter is held non-responsive to noise signals generated in the receiver.

Figure 1:
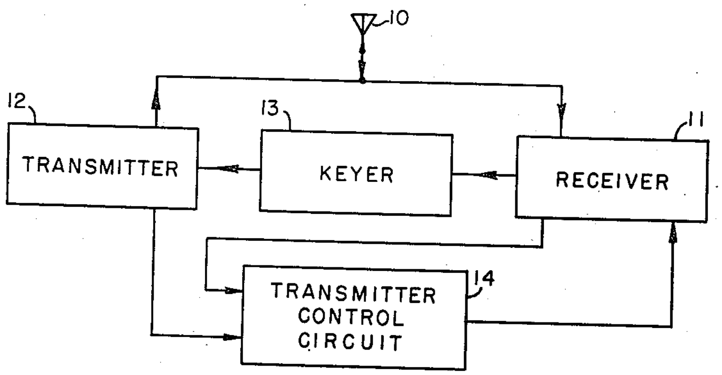
Fig. 1 shows in block form a typical embodiment of the features of the present invention.

With reference now to Fig. 1, a particular embodiment of the invention is shown in which electrical energy signals from a remote source are intercepted by a receiving device or antenna 10. These intercepted energy signals are applied to a receiver 11 where they are amplified to an energy level suitable for the operation of a transmitter 12 through a keying device 13, which may be simply an amplification stage but which may include a frequency division stage. Electrical energy produced by the transmitter 12 is passed to the antenna for radiation thereby.

The transmitter control circuit 14 is employed to vary the sensitivity of the receiver 11 so that the amplitude of signals delivered to the keyer 13 may be controlled. The keyer 13 is preferably biased to produce a transmitter keying signal only for receiver output signals exceeding a selected amplitude.

Simultaneously with the production of an output signal by the transmitter 12, a signal is applied to the transmitter control circuit 14. Also applied to the transmitter control circuit 14 is the output signal from the receiver 11. The two input signals to the transmitter control circuit 14 are integrated and applied to the receiver 11 to control the amplification thereof. The integrated signal developed by control circuit 14 is substantially of a filtered D. C. nature derived in dependency on the input signal. Integration of control signals from the receiver alters the amplification of the receiver so that the average frequency of the output signals (including noise) therefrom is maintained constant at a selected level, it is therefore a form of automatic pulse frequency control. Integration of control signals from the transmitter 12 alters the gain of the receiver to prevent excessive operating rates of the transmitter 12.

Figure 2:
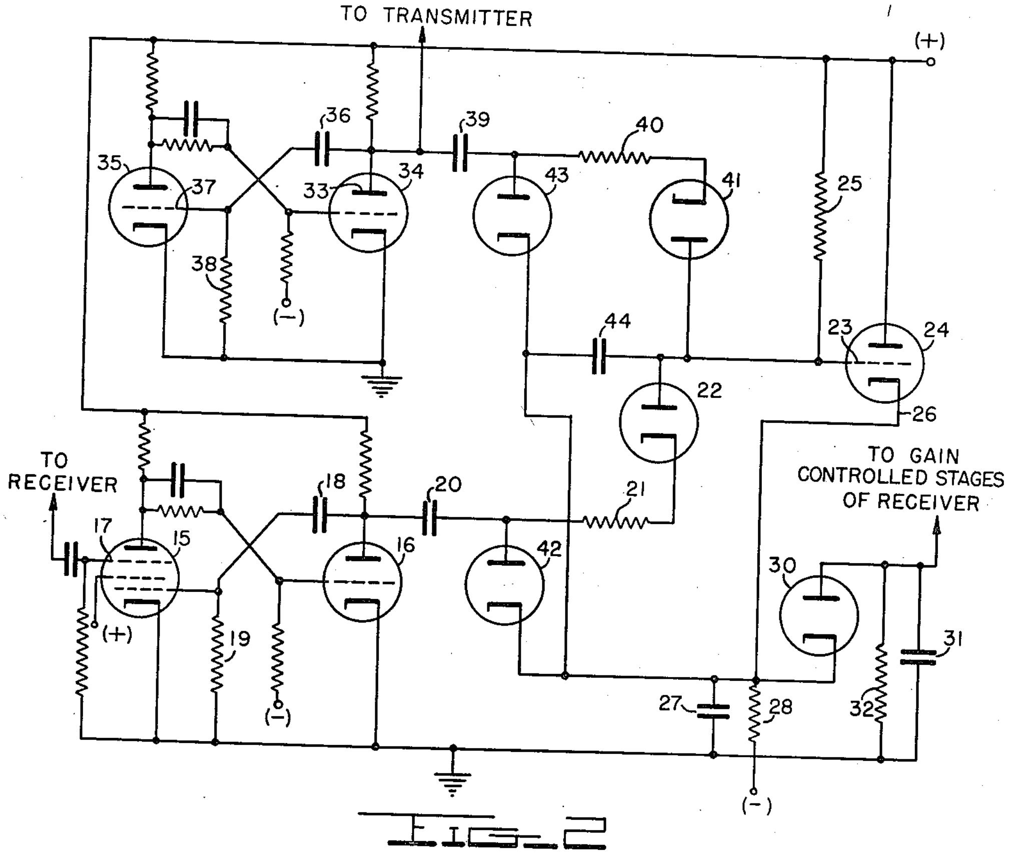
Fig. 2 is a schematic diagram of a component of the system of Fig. 1.

The operation of a typical transmitter control circuit 14 may be understood more fully with the aid of Fig. 2, to which reference is now had.

Receiver output signals are applied to a one-shot multivibrator comprising tubes 15, 16 which is maintained in a steady state wherein tube 15 is conductive. Conduction by tube 15 is interrupted by a negative signal applied to the grid 17 thereof resulting in the production of a negative pulse at the plate of tube 16, the duration of which is determined primarily by the time constant circuit including capacitance 18 and resistance 19. Multivibrator 15, 16 is preferably adapted for rapid operation such that it will be capable of responding to receiver output signals exceeding a selected amplitude applied to grid 17 which have a recurrence frequency typically as high as 75 kilocycles per second.

The negative pulse signals from the anode of tube 16 are supplied through capacitance 20, resistance 21, and diode electron tube 22 to the grid 23 of the cathode loaded integrator tube 24. A filter capacitance 44 is connected to grid 23. The steady state conduction condition of tube 24 is that of high conductivity by reason of the return of grid 23 to a positive voltage through resistance 25. When the anode of tube 16 drops in response to the application of an input pulse signal to tube 15, grid 23 drops slowly causing a change in the rate of flow of anode current through tube 24. A corresponding change in voltage at the cathode 26 is delayed, however, by the filter capacitance 27 connected across the loading resistance 28. Where a series of filtered negative pulses is applied to the grid 23 because of repeated triggering of the multivibrator 15, 16, the potential at the cathode 26 falls. At some point during this negative excursion of cathode 26, diode electron tube 30 is brought to conduction to produce charging of capacitance 31 which, together with resistance 32 forms a filter circuit for supplying a D. C. voltage level to the gain controlled stages of the receiver, typically the control grids of remote cutoff amplifier tubes.

Signals derived in response to the production of electrical energy by the transmitter 12 are applied to the anode 33 of tube 34. Tube 34 forms, together with tube 35, a one-shot multivibrator circuit in which tube 35 is normally conductive. A negative pulse from the transmitter 12, when applied to the anode 33, is communicated through the coupling capacitance 36 to the grid 37 of tube 35, resulting in a change of conductivity state in the multivibrator 34, 35. Tub 34 is rendered conductive to produce, at anode 33, a negative impulse whose duration is determined primarily by the time constant circuits including capacitance 36 and resistance 38. This multivibrator (34, 35) is necessary only where the signals from transmitter 12 may possess variable characteristics. If the transmitter signals are of uniform characteristics, multivibrator 34, 35 may be replaced by a single isolating device to supply a transmitter signal to the anode of tube 43.

Negative pulses from tube 34 are supplied to the grid 23 of tube 24 through capacitance 39, resistance 40, and the electron tube 41 to produce anode current cutoff of tube 24 with a resultant alteration in the voltage of cathode 26 as previously described.

Since the multivibrator 15, 16 is responsive to substantially all of the signals in the output of receiver 11, while the multivibrator 34, 35 is responsive only to those pulses causing triggering of the transmitter 12, the frequency of the negative impulses produced at the anode of tube 16 is much greater than the frequency of the pulses produced at the anode 33. It may therefore be advantageous to select the time constant circuit 36, 38 so that the duration of the pulses from tube 34 is greater than the duration of the pulses from tube 16. In any case, the duration of the multivibrator pulses must be selected so that the desired response of the circuit to signals from both sources is maintained. Both diodes 42, 43 are clamper tubes operating to maintain a maximum positive potential at the anodes thereof equal to the potential of the cathode of tube 26.

From the foregoing discussion it is apparent that considerable modification of the features of this invention is possible but while the device herein described and the form of apparatus for the operation thereof constitutes a preferred embodiment of the invention it is to be understood that the invention is not limited to this precise device and form of apparatus and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. In an electrical signaling system, a receiver for receiving first signals and for providing related output signals, a transmitter for transmitting second signals, means connected between the receiver and the transmitter and responsive to the output signals of the receiver having a predetermined magnitude for controlling the generation of said second signals, means connected to said receiver and to said transmitter for providing third signals and fourth signals in dependency on said first signals and said second signals, respectively, means connected to said last mentioned means for combining said third signals and said fourth signals to provide a control signal having a direct current signal component, and means applying said control signal to said receiver for controlling the gain thereof in dependency on said control signal.

2. In an electrical signaling system, a receiver for receiving first signals and for providing related output signals, a transmitter for transmitting second signals, means connected between the receiver and the transmitter and responsive to the output signals of the receiver having a predetermined magnitude for controlling the generation of said signals, means connected to said receiver and to said transmitter for providing third signals and fourth signals in dependency on said first signals and said second signals, respectively, means connected to said last mentioned means for providing a control signal having a direct current signal component whose magnitude is dependent upon the number of first signals and second signals occurring in a given time interval, and means applying said control signal to said receiver for controlling the gain thereof in dependency on said control signal.

References Cited in the file of this patent

UNITED STATES PATENTS

| | | |
|---|---|---|
| 2,414,922 | Wheeler | Jan. 28, 1947 |
| 2,415,359 | Loughlin | Feb. 4, 1947 |
| 2,429,513 | Hansen et al. | Oct. 21, 1947 |
| 2,444,721 | Blaisdell | July 6, 1948 |
| 2,530,096 | Sudman | Nov. 14, 1950 |
| 2,592,777 | Williams | Apr. 15, 1952 |
| 2,654,833 | Lord | Oct. 6, 1953 |

FOREIGN PATENTS

| | | |
|---|---|---|
| 902,415 | France | Dec. 4, 1944 |